United States Patent
Nevaux

(10) Patent No.: US 10,351,112 B2
(45) Date of Patent: Jul. 16, 2019

(54) APPARATUSES AND METHODS FOR TESTING VEHICLE STONE CHIPPING

(71) Applicant: Toyota Motor Engineering & Manufacturing North America, Inc., Erlanger, KY (US)

(72) Inventor: Kevin C. Nevaux, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 158 days.

(21) Appl. No.: 15/421,670

(22) Filed: Feb. 1, 2017

(65) Prior Publication Data

US 2018/0143120 A1 May 24, 2018

Related U.S. Application Data

(60) Provisional application No. 62/424,641, filed on Nov. 21, 2016.

(51) Int. Cl.
*B60T 8/00* (2006.01)
*E02F 3/65* (2006.01)
*G01M 17/007* (2006.01)

(52) U.S. Cl.
CPC ........... *B60T 8/00* (2013.01); *G01M 17/0078* (2013.01); *E02F 3/65* (2013.01)

(58) Field of Classification Search
CPC ............ B60T 8/00; G01M 17/00; G01M 1/00
See application file for complete search history.

(56) References Cited

U.S. PATENT DOCUMENTS

| 4,227,718 | A | | 10/1980 | Durben | |
|---|---|---|---|---|---|
| 4,840,400 | A | | 6/1989 | Greenleaf | |
| 5,024,090 | A | * | 6/1991 | Pettigrew | G01V 1/00 73/572 |
| 6,422,071 | B1 | * | 7/2002 | Heil | G01N 3/567 73/150 R |
| 7,575,086 | B2 | * | 8/2009 | Kamei | G01L 1/16 180/274 |

(Continued)

FOREIGN PATENT DOCUMENTS

| CN | 20434666 U | 5/2015 |
|---|---|---|
| JP | H1054780 A | 2/1998 |

(Continued)

*Primary Examiner* — Randy W Gibson
*Assistant Examiner* — Gedeon M Kidanu
(74) *Attorney, Agent, or Firm* — Dinsmore & Shohl LLP

(57) ABSTRACT

An apparatus for testing vehicle stone chippings is disclosed. The apparatus includes a stone chipping rig having a chassis. The chassis includes a first end, a second end, and a longitudinally extending tongue extending from the second end. A rolling fixture is coupled to the first end of the chassis. A stone chipping test device is coupled to the first end of the chassis adjacent to the rolling fixture for measuring an impact force of a stone that strikes the stone chipping test device. The apparatus further includes a pilot vehicle used to receive the stone chipping rig so as to measure the impact force of the stone launched off the pilot vehicle wheels when the pilot vehicle travels on a road with loose gravel. The stone chipping rig is defined as a test vehicle towed at a fixed distance behind the pilot vehicle.

20 Claims, 8 Drawing Sheets

(56) References Cited

U.S. PATENT DOCUMENTS

| | | | |
|---|---|---|---|
| 7,756,670 B2* | 7/2010 | Mancosu | B60T 8/172 |
| | | | 702/151 |
| 9,051,699 B2 | 6/2015 | Rowland | |
| 9,404,840 B2 | 8/2016 | Hondroulis et al. | |
| 2009/0108565 A1* | 4/2009 | Moyna | E02F 3/65 |
| | | | 280/481 |
| 2009/0326835 A1* | 12/2009 | Housen | G01L 5/0052 |
| | | | 702/41 |
| 2010/0163675 A1* | 7/2010 | Rashid | B32B 17/10009 |
| | | | 244/129.3 |

FOREIGN PATENT DOCUMENTS

| | | |
|---|---|---|
| KR | 100217609 B1 | 9/1999 |
| KR | 20070046999 A | 5/2007 |
| KR | 20120097176 | 9/2012 |

* cited by examiner

APPARATUSES AND METHODS FOR TESTING VEHICLE STONE CHIPPING

CROSS-REFERENCE TO RELATED APPLICATIONS

This application claims the benefit of U.S. Provisional Application No. 62/424,641, entitled "APPARATUSES AND METHODS FOR TESTING VEHICLE STONE CHIPPING," filed Nov. 21, 2016, the entirety of which is hereby incorporated by reference.

TECHNICAL FIELD

The present specification generally relates to stone chipping test apparatuses and methods for stone chipping force impact damage simulation and, more specifically, to stone chipping test apparatuses and methods that simulate the impact force of a stone on various components of a vehicle.

BACKGROUND

Damage to various vehicle components (e.g., condensers, radiators, etc.) caused by loose stones, gravel, and debris that strike the various vehicle components is a common problem. It is desirable to test and measure the effect of such impact on various vehicle components.

Accordingly, a need exists for stone chipping test apparatuses and methods for measuring stone chipping force impact damage simulation.

SUMMARY

In one embodiment, an apparatus for testing vehicle stone chippings is disclosed. The apparatus includes a stone chipping rig having a chassis. The chassis includes a first end, a second end, and a longitudinally extending tongue extending from the second end. A rolling fixture is coupled to the first end of the chassis. A stone chipping test device is coupled to the first end of the chassis adjacent to the rolling fixture for measuring an impact force of a stone that strikes the stone chipping test device. The apparatus further includes a pilot vehicle used to receive the stone chipping rig so as to measure the impact force of the stone launched off the pilot vehicle wheels when the pilot vehicle travels on a road with loose gravel. The stone chipping rig is defined as a test vehicle towed at a fixed distance behind the pilot vehicle.

In another embodiment, an apparatus having a stone chipping test device for testing vehicle stone chippings is disclosed. The stone chipping test device includes a first mounting frame having a plurality of grooves spaced apart from one another to receive a plurality of slats so as to form a grille. A second mounting frame is spaced apart from the first mounting frame and is removably attached to the first mounting frame by a plurality of unistrut channels. The second mounting frame includes a pressure measurement board attached thereto for measuring an impact force of vehicle stone chippings damage.

In yet another embodiment, a method for simulating vehicle stone chippings using a pilot vehicle is disclosed. The method is directed to attaching a stone chipping rig to the pilot vehicle. The stone chipping rig includes a chassis, a rolling fixture and a stone chipping test device coupled to the chassis. Next, towing the stone chipping rig by the pilot vehicle and measuring at least one of pressure, mass, and velocity of the vehicle stone chippings during the towing of the stone chipping rig. The method is further directed to establishing criteria based on the measurement of the pressure, mass, and velocity so as to determine a force and a kinetic energy of the stone chipping for designing one or more components of a vehicle to withstand damages by the vehicle stone chippings.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
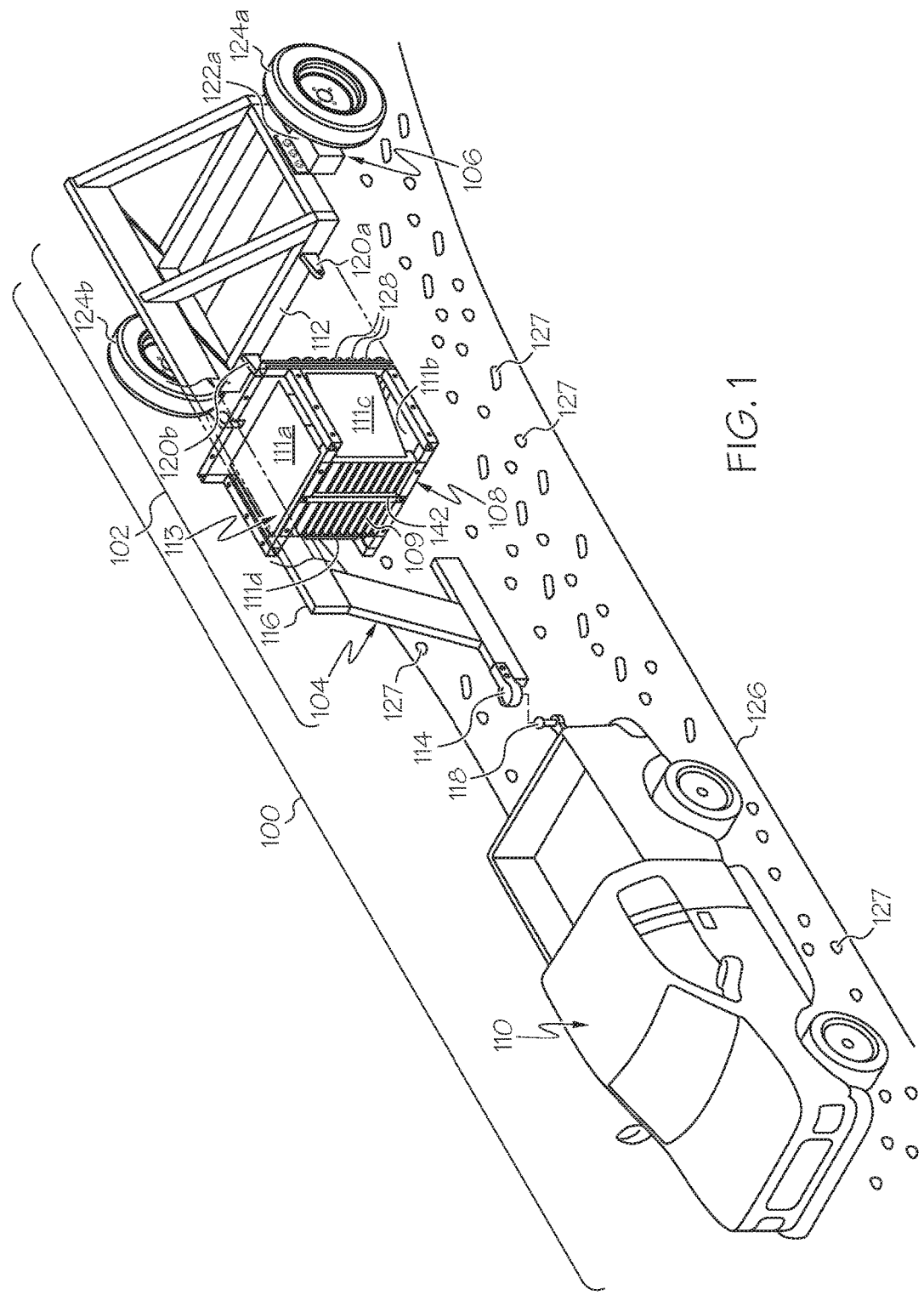
FIG. 1 is an exploded top perspective view of an apparatus defined by a stone chipping rig having a chassis, a rolling fixture, and a stone chipping test device all of which are in a spaced apart relationship with one another and with a pilot vehicle according to one or more embodiments shown and described herein.

Referring generally to the figures, embodiments of the present disclosure are generally directed to apparatuses and methods for testing and/or simulating vehicle stone chipping. More specifically, the present disclosure is directed to apparatuses and methods for measuring the impact force of a stone or piece of gravel striking various vehicle components. One of the advantages of the present disclosure is that there is no need for two vehicles (a pilot or lead vehicle and a test vehicle) to conduct measuring the impact force of a stone on one or more components of a test vehicle since the test vehicle is replaced with a stone chipping rig. The stone chipping rig is attached to the rear hitch of the pilot vehicle. The stone chipping rig comprises a chassis, a rolling fixture, and a stone chipping test device all of which are attached to one another to resemble the test vehicle. Since the stone chipping rig attaches to the pilot vehicle at a fixed distance, then the stone chipping rig eliminates the risk associated when the test vehicle is traveling behind the pilot vehicle at a predetermined distance and speed on a road with loose gravel. The stone chipping rig includes a grille that resembles a vehicle grille, a pressure measurement film attached to a board that resembles the surface of a vehicle component such as a condenser or a radiator, and a high speed photography camera. The pressure measurement film and the high speed photography camera register the stone contacts of varying forces (stone mass, stone height, stone velocity) to measure pressure and energy of the stone and then compare these values to the values provided by a supplier of components (e.g., condenser and/or radiator) of the test vehicle. Moreover, the stone force density can be obtained so as to determine the distribution of high force stone contacts to lower force contacts. Obtaining these data provide a correlation of the impact pressure versus the condenser height at different speeds. In one embodiment, during the actual test, the pilot vehicle travels on the road with loose pieces of gravel at a predetermined speed such that stones of various sizes are launched off the wheels of the pilot vehicle and pass through the grille and impinge the pressure measurement film. Since the pressure of each stones is measured by the pressure measurement film, then the force of the impingement by such stone can be calculated.

Next, during the test, stones are caught in stone catching pouches for measuring the mass, size and weight. Using a high speed photography camera, the velocity of the stone and the path in which the stone is flying through the grille can be measured as well. It should be noted that there are at least three parameters that affect the force or pressure against the condenser by the impingement of the stone and means to minimize or eliminate the damage this force can cause on the surface of the condenser. The three parameters are namely: 1) distance (D) of the grille opening to the surface of the condenser, 2) the gap (G) or pitch between the grille slats, and 3) the width (W) or depth of the slats of the grille. The inventor of the present disclosure has conducted various tests to evaluate how changes in value of these three parameters may affect the stone impingement on the condenser or the pressure measurement film. For example, by increasing the width (W) of the grille, since the stone is moving in an arc or trajectory, then there is a strong possibility that the stone would strike first on some portion of width (W) of grille and then be deflected downward or at the very least, the speed of the stone is substantially reduced before striking the surface of the condenser or the pressure measurement film. Alternatively, by narrowing the gap (G) or the pitch between the slats of the grille, some stones with certain sizes will not pass through the gap (G), but narrowing the gap (G) or the pitch would compromise the volume of air flow through the grille slats. In addition, by adjusting the distance (D) of the grille slats to the condenser, the impact of the force of the stone on the condenser can be minimized. Moreover, by measuring the mass (m) and velocity (v) of the stone, then the kinetic energy (ke) of the stone (ke=½mv$^2$) can be calculated. Knowing the kinetic energy of the stone, the damage to the condenser by the stone can be evaluated and corrective measures can be taken to minimize or eliminate the damage to the condenser by the stone.

Figure 2:
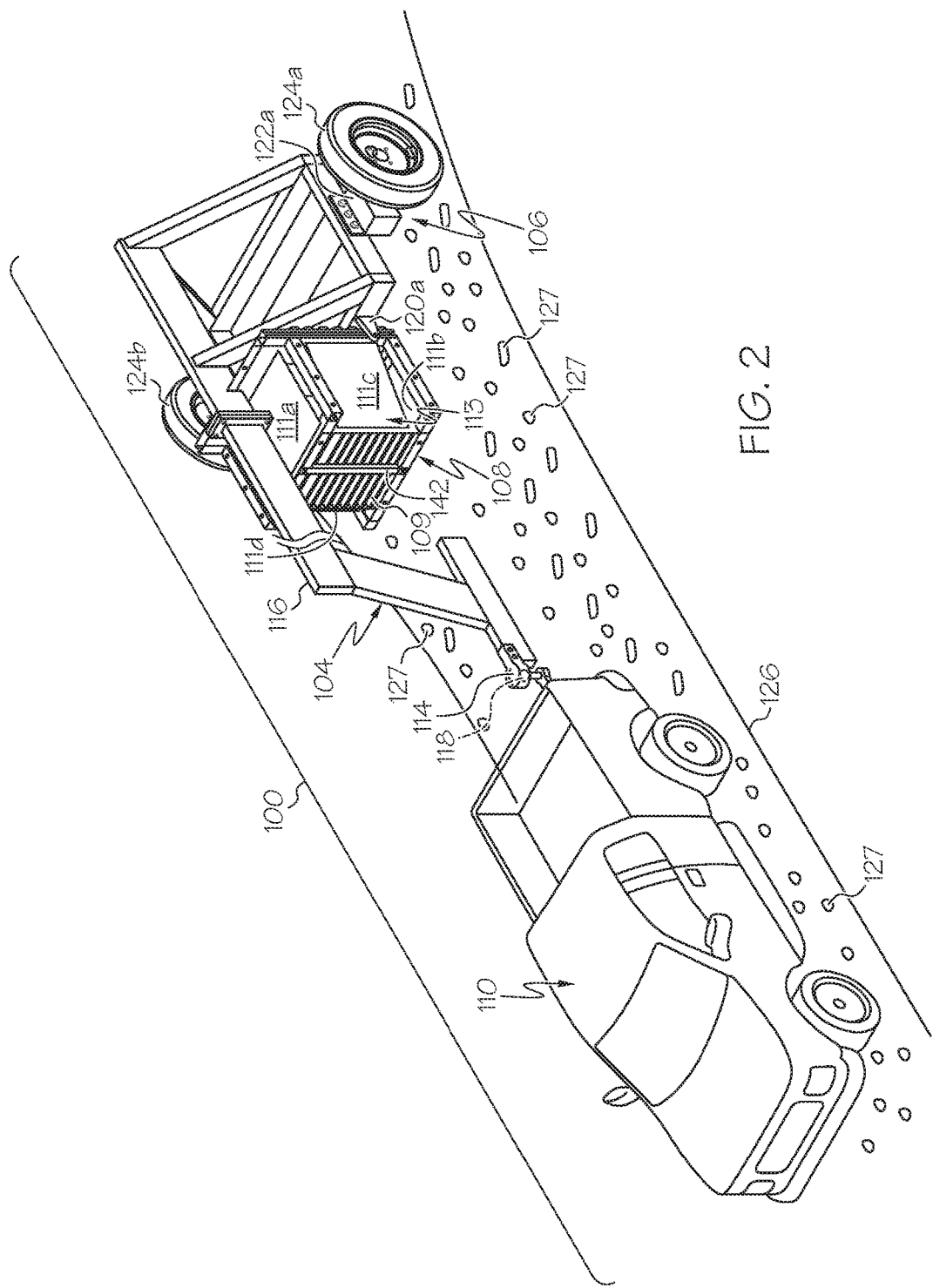
FIG. 2 is similar to FIG. 1 and illustrating the apparatus defined by the stone chipping rig and using the pilot vehicle in an assembled position according to one or more embodiments shown and described herein.

FIG. 1 illustrates an exploded top perspective view of an apparatus 100 used for simulating vehicle stone chippings according to one or more embodiments shown and described herein. The apparatus 100 is defined by a stone chipping rig 102 having a chassis 104, a rolling fixture 106, and a stone chipping test device 108 all of which are in a spaced apart relationship with one another and with a pilot vehicle 110. FIG. 2 illustrates the apparatus 100 of FIG. 1 in an assembled position. The stone chipping rig 102 is coupled to the pilot vehicle 110. The stone chipping rig 102 includes the chassis 104, the rolling fixture 106, and the stone chipping test device 108 all of which are removably attached with one another to resemble and to replace a test vehicle. The chassis 104 includes a first end 112, a second end 114, and a longitudinally extending tongue 116. The second end 114 of the chassis 104 is attached to rear hitch 118 of the pilot vehicle 110 via the longitudinally extending tongue 116. As seen best in FIG. 2, the rolling fixture 106 is coupled to the first end 112 of the chassis 104 and the stone chipping test device 108 is configured to be coupled to the first end 112 of the chassis 104 via two spaced apart mounting tabs 120a, 120b as will be discussed in greater detail hereinafter. The rolling fixture 106 includes two respective driving mechanisms 122a, 122b each of which is attached to respective wheels 124a, 124b on opposed side of the first end 112. It should be noted that in some embodiments the two respective driving mechanism 122a, 122b could be replaced by an axial shaft attached to the wheels. The stone chipping test device 108 is positioned adjacent to the rolling fixture 106 for measuring the impact of the vehicle stone chippings damage to the stone chipping test device 108 by the pilot vehicle 110 when the pilot vehicle travels on a road 126 with loose gravel or stones 127. The stone chipping test device 108 includes a grille 109 and a plurality of wallboards defined by a top wallboard 111a, a bottom wallboard 111b, two side wallboards 111c, and 111d forming an enclosure 113 as seen best in FIG. 1. Moreover, the stone chipping test device 108 further includes a plurality of stone catching pouches 128 contiguously attached thereto to form stone catching pouches 128 for measuring sizes of the stone 127. As noted hereinbefore, there is no need for two vehicles (lead vehicle and test vehicle) to conduct measuring the impact force of a stone on one or more components of the test vehicle since the test vehicle is replaced with the stone chipping rig 102. In one embodiment, the stone chipping test device 108 is positioned, as a non-limiting example, at predetermined distance (e.g., 10 meters) behind the pilot vehicle 110. However, it should be noted that since the longitudinally extending tongue 116 is adjustable, other distances between the stone chipping test device 108 and the pilot vehicle 110 are within the scope of the present disclosure.

Figure 3:
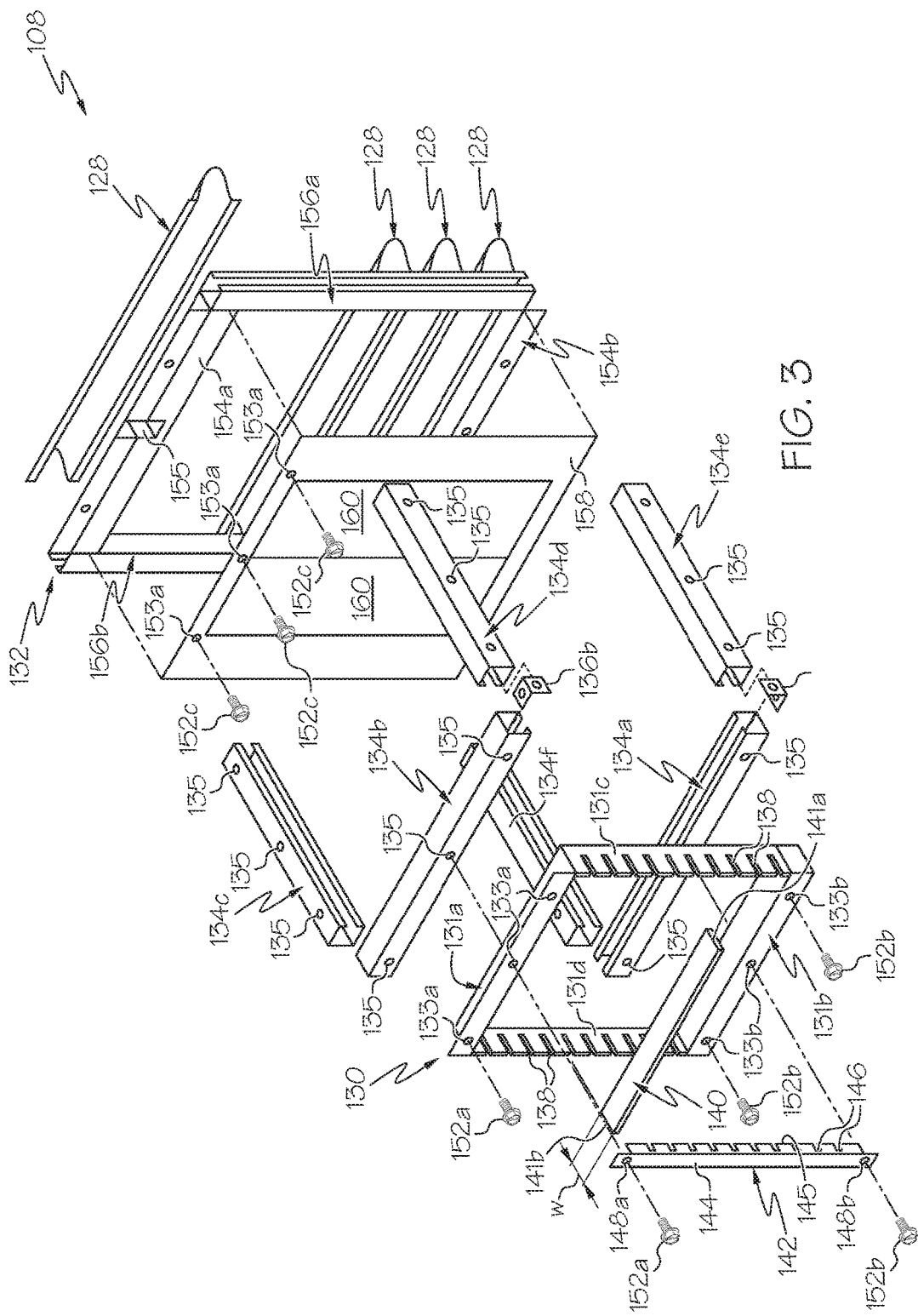
FIG. 3 is an exploded view of the stone chipping test device without the chassis, rolling fixture, and the pilot vehicle according to one or more embodiments shown and described herein.

Referring now to FIG. 3, an exploded view of the stone chipping test device 108 without the chassis 104 and the pilot vehicle 110 is depicted. The stone chipping test device 108 comprises a first mounting frame 130 and a second mounting frame 132 spaced apart from one another and removably attached to one another by a plurality of unistrut channels 134a, 134b, 134c, 134d, 134e, and 134f. The first mounting frame 130 includes a plurality of grooves 138 spaced apart from one another to receive a plurality of slats 140 so as to form the grille 109 shown in FIG. 1. In the exemplary FIG. 3, one slat 140 is shown, but there are a number of similar slats 140 used to cover the face of the first mounting frame 130. The first mounting frame 130 is generally a rectangularly-shaped frame constructed from respective first top and bottom support members 131a, and 131b, and respective first opposed side support members 131c, and 131d, all of which are attached to one another by any attaching means such as fasteners, bolts and/or welded together. The plurality of grooves 138 are formed parallel with one another on the respective first opposed side support members 131c, and 131d. However, depending on the orientation of the plurality of slats 140, the grooves may be non-parallel as well. As just noted, there is shown one slat 140 in a spaced apart relationship with respect to the first mounting frame 130, but it should be noted that there is one slat 140 for every corresponding pair of grooves 138 formed on respective first opposed sides support members 131c, and 131d. As an example, the slat 140 includes two opposed ends 141a, 141b each of which is inserted into the corresponding grooves 138 on first opposed side support members 131c, 131d. Each of the plurality of slats 140 includes a width (W) and the slats are spaced apart parallel from one another at a predetermined distance. It should be noted that the plurality of grooves 138 are formed such that the grooves extend to a portion of width of the respective first side support members 131c, 131d so as to securely hold the slats 140 in place. Each of the respective top and bottom support members 131a, and 131b includes a plurality of bolt holes 133a and 133b that are used to receive respective bolts 152a and 152b. The first mounting frame 130 further includes a mounting bar 142 having a base plate 144 and a narrow plate 145 integrally attached thereto and projected outwardly from the mid-portion of the base plate 144. The narrow plate 145 includes a plurality of first slots 146 formed therein that are used to receive the corresponding plurality of slats 140 so as to prevent the slats 140 from any lateral movement. The mounting bar 142 includes bolt holes 148a, 148b each of which is used to receive corresponding bolts 152a, 152b when the mounting bar 142 is fully engaged with the grille 109 as seen best in FIGS. 1 and 2.

Still referring to FIG. 3, the second mounting frame 132 is generally a rectangularly-shaped frame constructed from respective second top and bottom support members 154a, and 154b, and respective opposed second side support members 156a, and 156b all of which are attached to one another by any attaching means such as fasteners, bolts and/or welded together. The second top support member 154a includes a U-shaped groove 155 that is formed on the mid-portion of the second top support member 154a and is used to engage with the longitudinally extending tongue 116 (shown in FIG. 1) when the stone chipping test device 108 is mounted onto the chassis 104. A pressure measurement film 160 may be attached (e.g., adhesively) to a board 158 to define a surface of the test vehicle component such as a radiator or condenser. The board 158 is then attached to the second mounting frame 132 via bolts 152c and the bolt holes 153a. The second top support member 154a further includes the plurality of stone catching pouches 128 contiguously attached thereto to form stone catching pouches 128 for measuring the mass and size of the stones 127. As a non-limiting example, the first mounting frame 130 and the second mounting frame 132 are made of materials such as aluminum, stainless steel, copper, fiberglass, wood, plastic and the likes. Similarly, the stone catching pouches 128 are made of any flexible materials such as plastic or the like. As noted hereinbefore, the first mounting frame 130 and the second mounting frame 132 are removably attached to one another by the plurality of unistrut channels 134a, 134b, 134c, 134d, 134e, and 134f. The plurality of unistrut channels 134a, 134b, 134c, 134d, 134e, and 134f are structural means used in various constructions of the frames. The main advantage of unistrut channels are that there are many options available for rapidly and easily connecting lengths together and other items to the unistrut channels, using various specialized unistrut-specific fasteners and bolts. It can be assembled very rapidly with minimal tools and only moderately trained labor, which reduces costs significantly in many applications. A unistrut channel installation also can often be modified or added-to relatively easily if needed. In one embodiment, the plurality of unistrut channels 134a, 134b, 134c, 134d, 134e, and 134f are attached to the first mounting frame 130 and the second mounting frame 132 via respective first and second corner braces 136a, 136b, bolts 152c and the corresponding bolt holes 135. Similar to the first mounting frame 130 and the second mounting frame 132, the unistrut channels 134a, 134b, 134c, 134d, 134e, and 134f are made of materials such as aluminum, stainless steel, copper and the likes. However, as one of ordinary skill in the art would appreciate that in some embodiments the first mounting frame 130 and the second mounting frame 132 may be attached to one another by other means of connections such as using straight connecting rods and/or rods with hooks and welding them to one another.

Figure 4:
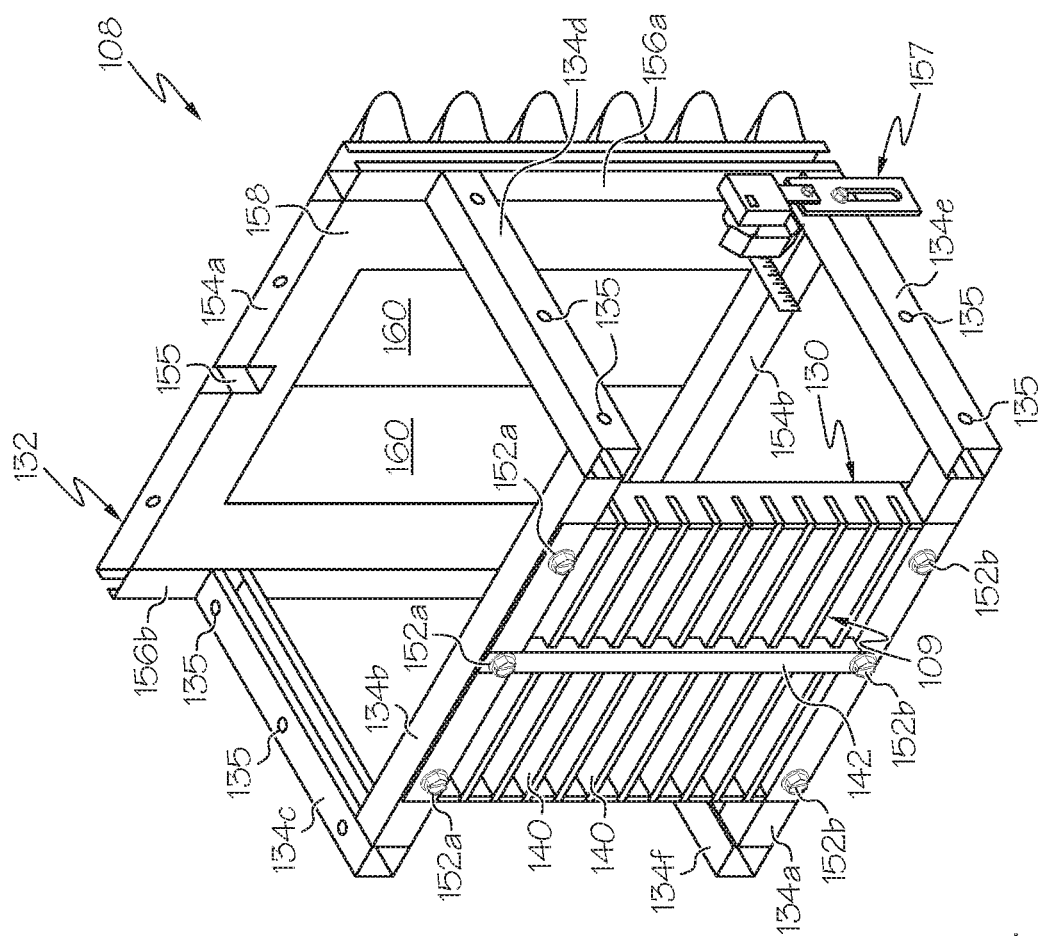
FIG. 4 depicts the stone chipping test device of FIG. 3 in an assembled position with a high speed photography camera mounted thereto according to one or more embodiments shown and described herein.

FIG. 4 is similar to FIG. 3 and illustrating the stone chipping test device 108 in an assembled position. When assembled, the stone chipping test device 108 is constructed and configured in a manner that resembles the grille and a component test area spaced apart from grille. In one embodiment, the component of the test vehicle may be a condenser or radiator positioned at a predetermined distance from the grille of the test vehicle. It should be understood that in some embodiments the stone chipping test device 108 may include actual vehicle components (e.g., condenser or radiator) at a vehicle test area. As noted previously, the pressure measurement film 160 simulates the surface of a condenser or radiator that is subjected to damage by stones 127 when conducting the experiment to measure the impact of the force of the stones 127 onto the pressure measurement film 160. It should be noted that during the test, the bottom, the sides and the top of the stone chipping test device 108 are enclosed with the wallboards 111a, 111b, 111c, and 111d so as to ensure that the stones 127 of certain sizes pass through the grille 109 only and strike the pressure measurement film 160 are measured since the test should resemble the actual test or condition of the test vehicle. In addition to measuring the force of the stone 127 by the pressure measurement film 160, the footprint of the stones 127 left onto the pressure measurement film 160 also provides valuable information about the behavior of the stone 127 as will be described in greater detail hereinafter. It should also be noted that each of the stone catching pouches 128 of the second mounting frame 132 is at different elevation with respect to the road 126 with loose gravel or stones 127. Therefore, in addition to measuring the mass and size of the stones 127 collected in each of the stone catching pouches 128, the stones 127 that are collected in each stone catching pouches 128, with respect to the loose gravel road 126, are indicative of a height (H) at which the respective stones 127 travel before captured by the respective stone catching pouches 128. Furthermore, a high speed photography camera 157 is mounted onto the unistrut channel 134f in proximity of the second mounting frame 132 so that during the experiment, the velocity of the stones 127 can be measured and the kinetic energy of each stone can be calculated as will be discussed in greater detail hereinafter. It should be noted that the high speed photography camera 157 can be mounted on other locations such as front or above the stone chipping test device 108 so long as the high speed photography camera 157 can target the trajectory of the stone 127.

Figure 5:
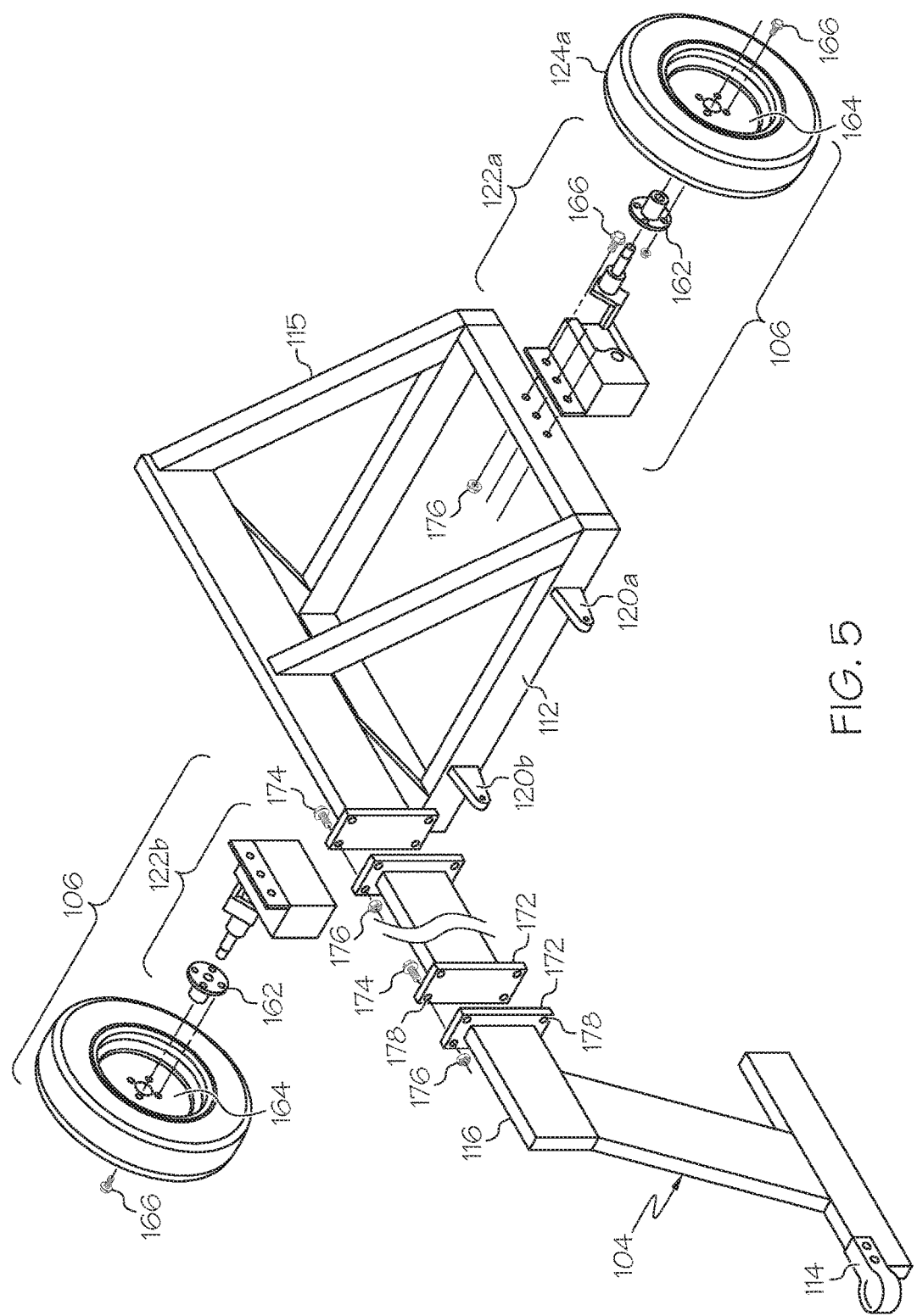
FIG. 5 is an exploded view of the rolling fixture in a spaced apart relationship with the chassis illustrating the manner in which the rolling fixture being attached to the chassis according to one or more embodiments shown and described herein.
Figure 6:
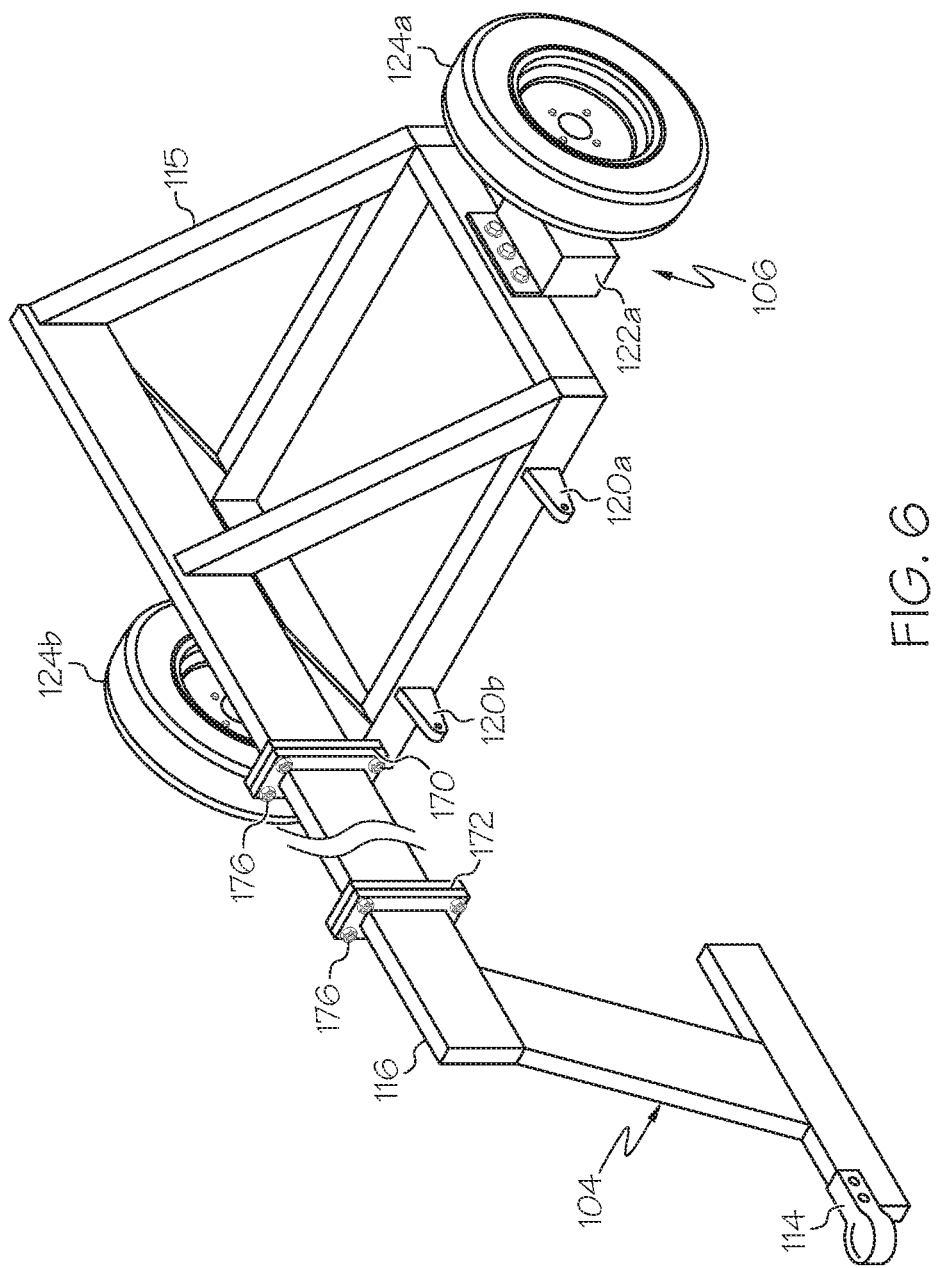
FIG. 6 depicts the rolling fixture and the chassis of FIG. 5 in an assembled position according to one or more embodiments shown and described herein.

Turning now to FIGS. 5 and 6, FIG. 5 depicts an exploded view of the rolling fixture 106 in a spaced apart relationship with the chassis 104 illustrating the manner in which the rolling fixture 106 is being attached to the chassis 104 and FIG. 6 illustrates the rolling fixture 106 in an assembled position with the chassis 104 according to one or more embodiments shown and described herein. As noted hereinbefore, the rolling fixture 106 is coupled to the first end 112 of the chassis 104. The entire length of stone chipping rig 102 can be adjusted via the longitudinally extending tongue 116. The longitudinally extending tongue 116 includes two pairs of identical mounting plates 170, 172 which permit the length of the longitudinally extending tongue 116 to be adjusted. Each pair of the identical mounting plates 170 and 172 is attached by the respective bolts 174 and nuts 176 using the bolt holes 178 as seen best in FIG. 6. The rolling fixture 106 includes two respective driving mechanisms 122a, 122b each of which is attached to respective wheels 124a, 124b on opposed side of the first end 112. The first end 112 of the chassis 104 is defined by a gable-shaped structure 115 and is in sync with the respective driving mechanisms 122a, 122b which substantially enhances the stability of the stone chipping rig 102 during traveling behind the pilot vehicle 110 on uneven surfaces. Each of the respective drive mechanisms 122a, 122b includes a respective axle flange 162 that connects the respective drive mechanisms 122a, 122b to a respective rim 164 of the respective wheels 124a, 124b via bolt 166 and nut 176. Each of the respective drive mechanisms 122a, 122b is set up in such a way as to allow the wheels 124a, 124b on the left and right side of the gable-shaped structure 115 to move vertically independently of each other while driving on uneven surfaces.

Figure 7:
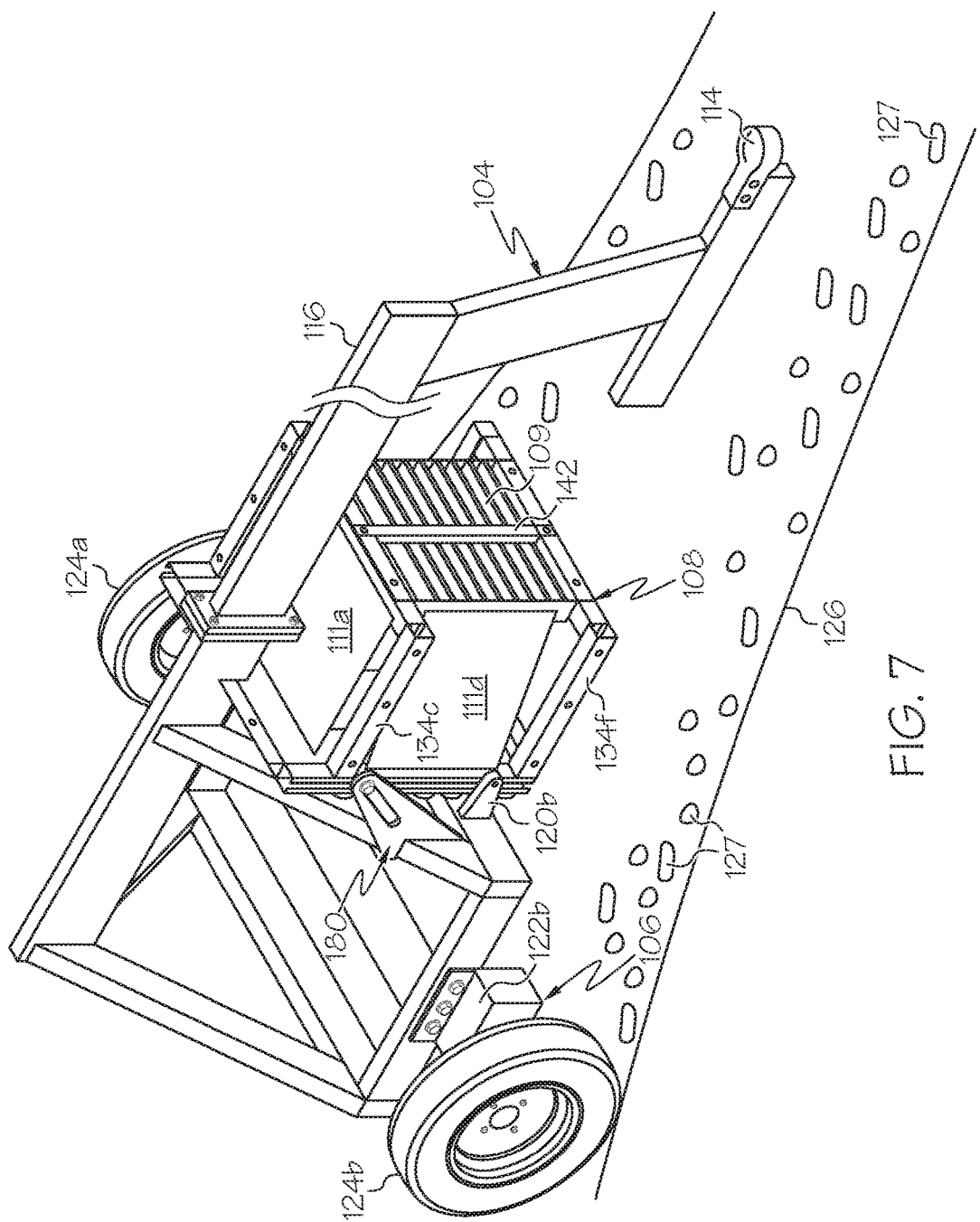
FIG. 7 depicts an opposite side of the stone chipping rig shown in FIG. 1 to expose an adjustable bracket tilt used to mount the stone chipping test device to the stone chipping rig according to one or more embodiments shown and described herein.

Referring to FIG. 7 which depicts an opposite side of the stone chipping rig 102 shown in FIG. 1 to expose an adjustable bracket tilt 180 used to mount the stone chipping test device 108 to the stone chipping rig 102. The chassis 104 further includes the adjustable bracket tilt 180, which in combination with the two spaced apart mounting tabs 120a, 120b, and the adjustable bracket tilt 180 is used to removably attach the stone chipping test device 108 to the chassis 104. Thus, there are three points of connection between the stone chipping test device 108 and the chassis 104. The adjustable bracket tilt 180 permits the whole the stone chipping test device 108 to tilt slightly back or forth and slide up and down.

Figure 8:
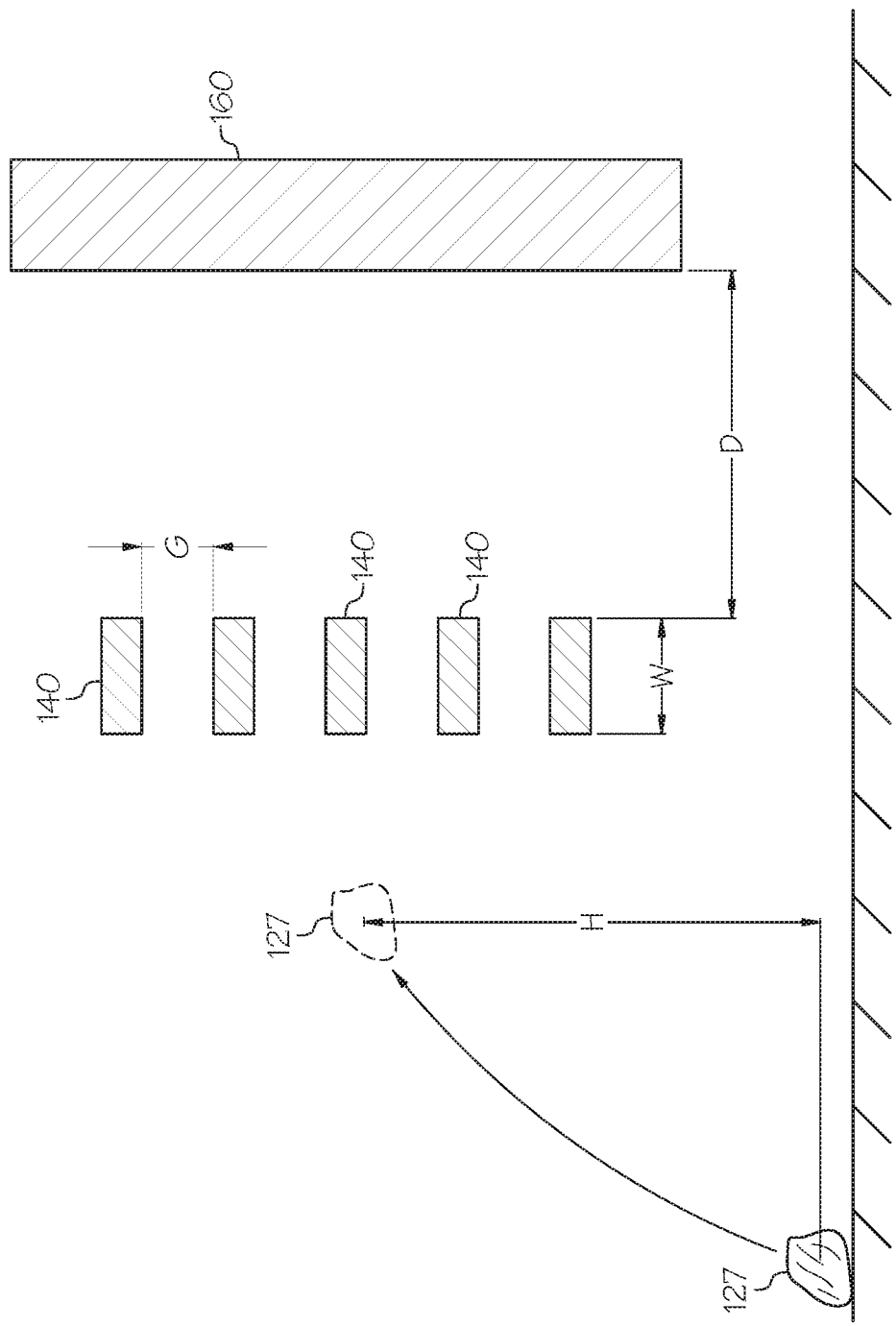
FIG. 8 illustrates a sectional view of a surface component such as a condenser of a test vehicle in spaced apart relationship with several sectional view of slats and a stone in an elevated position from a road with loose gravel according to one or more embodiments shown and described herein.

Referring to FIG. 8 and for the purpose of illustration only, a sectional view of the pressure measurement film 160, the slats 140 for the grille 109, and a stone 127 which are all in a spaced apart relationship with one another is shown. The pressure measurement film 160 simulates a surface of a component, such as a condenser, of the test vehicle. The slats 140 simulate the grille 109 of the test vehicle and the stone 127 positioned at an elevated position from a road 126 with loose gravel is shown. The purpose of the illustration is to denote that there are at least three parameters that affect the force or pressure against the condenser by the impingement of the stone 127 and means to minimize or eliminate the damage this force can cause on the surface of the condenser. The three parameters are namely: 1) distance (D) of the grille opening to surface of the condenser, 2) the gap (G) or pitch between the slats 140, and 3) the width (W) or depth of the slats 140 of the grille 109. The inventor of the present disclosure has conducted various tests to evaluate how changes in value of these three parameters may affect the stone impingement on the condenser or the pressure measurement film 160. For example, in one embodiment, by increasing the width (W) of the grille 109, since the stone 127 is moving in an arc or trajectory, there is a strong possibility that the stone 127 would strike first on some portion of width (W) of grille 109 and then be deflected downward or at the very least, the speed of the stone 127 is substantially reduced before striking the surface of the condenser or the pressure measurement film 160. In another embodiment, by narrowing the gap (G) or the pitch between the slats 140 of the grille 109, some stones with certain sizes will not pass through the gap (G), but narrowing the gap (G) or the pitch would compromise the volume of air flows through the slats 140. In addition, by adjusting the distance (D) of the slats 140 to the condenser, the impact of the force of the stone 127 on the condenser can be minimized. Moreover, by measuring the mass (m) and velocity (v) of the stone 127, the kinetic energy (ke) of the stone 127 (ke=½mv$^2$) can be calculated. Knowing the kinetic energy of the stone 127, the damage to the condenser by the stone can be evaluated and corrective measures can be taken to minimize or eliminate the damage to the condenser by the stone 127.

In operation, after assembling all the components such as the chassis 104, the rolling fixture 106, and the stone chipping test device 108 to one another to construct the stone chipping rig 102, the stone chipping rig 102 is attached to the rear hitch of the pilot vehicle 110. It should be noted that the distance between the stone chipping test device 108 and the rear end of the pilot vehicle 110 is predetermined, as a non-limiting example, to be 10 meters. In a first test, the pressure measurement film 160 is mounted onto to the second mounting frame 132 to measure the pressure of the stones 127 striking onto the pressure measurement film 160. Next, the pilot vehicle 110 travels at a speed of 80 kilometer per hour on the loose gravel road 126 covered with gravels or stones 127 of various sizes and shapes. Some of the stones 127 may randomly stroke the grille 109 and deflected downwardly back on the road 126 and some of the stones are passed through the gap or pitch of the grille 109 and are stroked the surface the pressure measurement film 160. The pressure measurement film 160 then registers the magnitude of the pressure of the stones 127. Knowing the pressure of the stones 127, the force can be calculated, since force is equal to a pressure exerted per unit area. As noted, the magnitude of the force and the location thereof onto the pressure measurement film 160 provides a user with valuable information about how the stone 127 travels on its path and passes through the grille 109 before striking the surface of the pressure measurement film 160. This valuable information would help the designers of the grille 109, radiator or condenser to adjust the design parameters such as grille gap (G) or pitch, the width (W) of the slats 140 and/or the distance (D) from the grille 109 to the pressure measurement film 160 so that the damage caused by the stones 127 is minimized or eliminated. The surface of the pressure measurement film 160 simulates the surface of a condenser or radiator of a vehicle.

In a second test, the pressure measurement film 160 is replaced by the plurality of the stone catching pouches 128 each of which is positioned at a different height with respect to the loose gravel road 126 and the high speed photography camera 157 is mounted in proximity of the second mounting frame 132. Again, the pilot vehicle 110 travels at a speed of 80 kilometer per hour on the loose gravel road 126 covered with gravel or stones 127. Some of the stones 127 may randomly stroke the grille 109 and deflected downwardly back on the road and some of the stones are passed through the gap or pitch of the grille 109 and are captured by the stone catching pouches 128. Next, the velocity of the stones 127 are measured by the high speed photography camera 157 and the mass of each stone 127 collected is measured as well. Knowing the mass and velocity of each stone 127, then the kinetic energy of the stone 127 can be calculated as discussed hereinbefore. It should be noted that since each of the stone catching pouches 128 is located at a different height, with respect to the loose gravel road 126, the number of stones 127 captured in each of the stone catching pouches 128 is indicative of the behavior of the stone 127 as they travel through their path into the stone catching pouches 128. For example, if there are more stones 127 in the third pouch, as compared to the second or fourth pouches, then the second test reveals that where the location of the condenser should be with respect to the loose gravel road 126 to avoid damage to the condenser. In addition, the location of stones 127, in the respective stone catching pouches 128, also reveals the height the stones 127 travel before striking the grille 109 or pass through the grille 109 and being captured by the stone catching pouches 128.

As will be appreciated by those skilled in the art, various modifications to the embodiment of the apparatus and method for simulating vehicle stone chipping hereinabove described are possible. For example, the configuration of the stone chipping rig 102 is not limited to the illustrated embodiment, and various other arrangements of components and/or subassemblies are possible to form the stone chipping rig 102, while meeting the strength requirements imposed in the use of the present disclosure. In particular, the arrangement for attaching the stone chipping test device 108 to the chassis 104 is not limited to the construction based on the spaced apart mounting tabs 120a, 120b, as described above, and may include other means, such as a simple hook or channel into which stone chipping test device 108 is engaged with the chassis 104. Also, the location of the stone chipping test device 108 is not limited to center location of the chassis as illustrated. Instead, in some applications, the stone chipping test device 108 may be placed on the side longitudinal bars based on the configuration. Further, the rolling fixture 106 or the driving mechanism 122a, 122b may be replaced with any other rotating elements, such as wheels with a shaft may be used. Still further, the driving mechanism 122a, 122b is not limited to independent suspensions and, for example, other powertrain devices may also be used to controllably engage with the chassis 104, especially when such apparatus 100 can be conveniently powered by a particular pilot vehicle 110 used in a particular application. Finally, as described hereinabove, the stone chipping rig 102 is mounted on a vehicle, such as a pickup truck, however, the stone chipping rig 102 may alternatively be mounted on different types of vehicles for the operation.

It should be understood that the apparatuses and methods of the present disclosure have developed a method which predicts condenser damage by the stone chipping vehicle based on the input of key designed parameters such as distance (D) of the grille opening to surface of the condenser, the gap (G) or pitch between the grille slats, and the width or depth of the slats of the grille as described in detail hereinbefore. The present disclosure provides criteria to design or styling of the vehicle components based on given vehicle design inputs. For example, determining the force and energy of the stone helps the suppliers of condensers and radiators to set the targets for condenser tube strength in development to resist stone damage and these test results can be compared directly with the condenser design criteria. The adjustable stone chipping rig is constructed for pressure and energy measurements of the stone chipping with the predetermined towing distance and speed set by the supplier correlation.

For the purposes of promoting an understanding of the principles of the present disclosure, reference will now be made to the embodiments illustrated in the drawings and specific language will be used to describe the same. It will nevertheless be understood that no limitation of the scope of the disclosure is thereby intended. The present disclosure includes any alterations and further modifications in the illustrated devices and described methods and further applications of the principles of the disclosure which would normally occur to one skilled in the art to which the present disclosure relates.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An apparatus for testing an impact force of a stone that strikes a test device, the apparatus comprising:
    a rig comprising:
        a chassis having a first end, a second end, and a longitudinally extending tongue that extends from the second end,
        a rolling fixture coupled to the first end of the chassis, and
        a test device coupled to the first end of the chassis adjacent to the rolling fixture for measuring an impact force of a stone that strikes the test device.

2. The apparatus of claim 1 wherein the longitudinally extending tongue has a length that is adjustable with respect to the pilot vehicle.

3. The apparatus of claim 1 wherein the first end of the chassis includes two spaced apart mounting tabs each of which is used to removably attach the test device to the chassis.

4. The apparatus of claim 1 wherein the chassis further includes an adjustable bracket tilt used to removably attach the test device to the chassis.

5. The apparatus of claim 1 wherein the rolling fixture includes two respective driving mechanisms each of which is mounted on opposed sides of the first end of the chassis.

6. The apparatus of claim 5 wherein each of the two driving mechanisms includes a wheel attached thereto.

7. The apparatus of claim 1 wherein the apparatus further comprises a pilot vehicle used to receive the rig so as to measure the impact force of one or more stones launched off the pilot vehicle wheels.

8. The apparatus of claim 7 wherein the rig is defined as a test vehicle towed at a fixed distance behind the pilot vehicle.

9. The apparatus of claim 7 wherein the longitudinally extending tongue is attached to the rear hitch of the pilot vehicle.

10. The apparatus of claim 1 wherein the test device comprises a first mounting frame and a second mounting frame that are spaced apart from one another and are removably attached to one another by a plurality of unistrut channels.

11. The apparatus of claim 10 wherein the second mounting frame includes a pressure measurement film that is attached to a board.

12. The apparatus of claim 10 wherein the second mounting frame comprises a plurality of pouches contiguously attached thereto for measuring stone mass and size.

13. The apparatus of claim 10 wherein the first mounting frame and the second mounting frame form an enclosure by a plurality of wallboards each of which is mounted on a bottom, a top, and sides thereof.

14. The apparatus of claim 10 wherein the first mounting frame includes a plurality of grooves formed spaced apart from one another to receive a plurality of slats so as to form a grille.

15. The apparatus of claim 14 wherein the first mounting frame includes a mounting bar having a base plate and a narrow plate integrally attached thereto and projected outwardly from the base plate wherein the narrow plate includes a plurality of first slots used to receive the corresponding plurality of slats so as to securely hold the slats in place.

16. The apparatus of claim 14 wherein each of the plurality of slats have a width and are spaced apart parallel from one another at a predetermined distance and wherein the grille is positioned at a predetermined distance from the pressure measurement film.

17. A test device comprising:
a first mounting frame having a plurality of grooves spaced apart from one another to receive a plurality of slats so as to form a grille; and
a second mounting frame spaced apart from the first mounting frame and removably attached thereto by a plurality of unistrut channels, the second mounting frame including a pressure measurement board attached thereto for measuring an impact force of a stone that strikes the pressure measuring board.

18. The apparatus of claim 17 wherein the first mounting frame and the second mounting frame form an enclosure by a plurality of wallboards each of which is mounted on a bottom, a top, and sides thereof.

19. A method for simulating an impact force of pieces of stone on vehicle components using a pilot vehicle, the method comprising:
attaching a rig to the pilot vehicle, the rig comprising a chassis, a rolling fixture, and a test device coupled to the chassis;
towing the rig by the pilot vehicle; and
measuring at least one of a pressure, a mass, or a velocity of the stone during the towing of the rig.

20. The method of claim 19 further comprising establishing criteria based on the measuring of the at least one of the pressure, the mass, or the velocity so as to determine a force and a kinetic energy of the stone for designing one or more components of a vehicle to withstand damages by the stone.

* * * * *